July 17, 1923.
E. A. LEWIS
1,462,016
UNIVERSAL JOINT AND POWER TRANSMISSION
Filed March 17, 1921  2 Sheets-Sheet 1
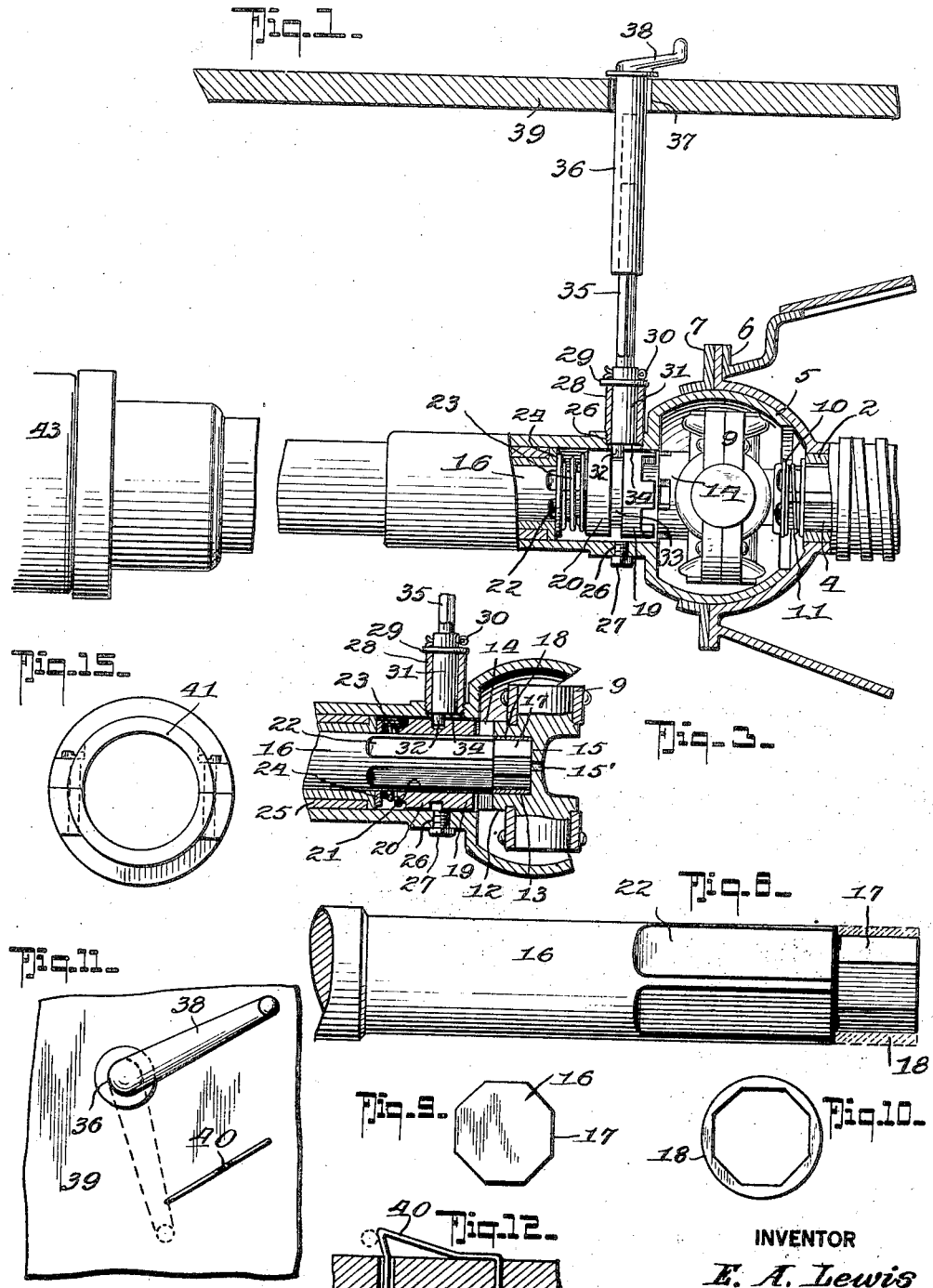
INVENTOR
E. A. Lewis
BY
Fred G. Dieterich & Co.
ATTORNEYS July 17, 1923.
E. A. LEWIS
1,462,016
UNIVERSAL JOINT AND POWER TRANSMISSION
Filed March 17, 1921    2 Sheets-Sheet 2
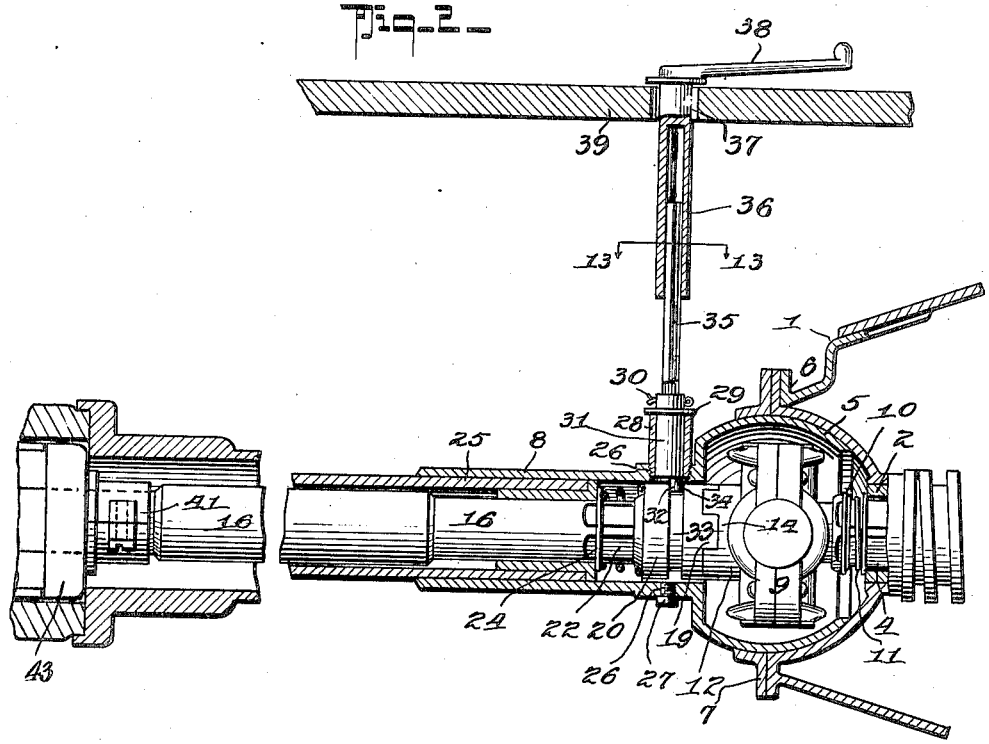
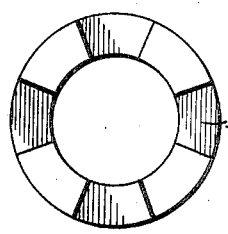
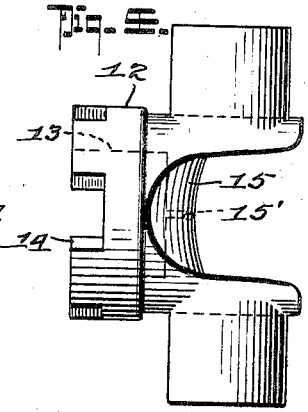
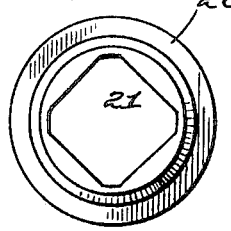
INVENTOR
E. A. Lewis
BY
Fred J. Dieterich
ATTORNEYS Patented July 17, 1923.

1,462,016

UNITED STATES PATENT OFFICE.

EDDIE ALLEN LEWIS, OF BELLEVILLE, KANSAS.

UNIVERSAL JOINT AND POWER TRANSMISSION.

Application filed March 17, 1921. Serial No. 453,048.

*To all whom it may concern:*

Be it known that I, EDDIE A. LEWIS, a citizen of the United States, residing at Belleville, in the county of Republic and State of Kansas, have invented a new and Improved Universal Joint and Power Transmission, of which the following is a specification.

My invention has for an object to provide means by the use of which the starting and stopping of an automobile will be facilitated, especially in cold weather.

Primarily the invention is intended for use on that type of car which employs a planetary transmission mechanism for effecting the speed changes and a disk clutch for effecting the direct or high speed connection between the engine and propelling shaft.

In cold weather, the thickening of the oil makes it quite difficult to start the engine or motor, owing to the fact that the clutch does not release good. This makes it necessary on frequent occasions to jack up a rear wheel and after putting the car in "high," start the motor with one rear wheel free.

My invention, therefore, has for one of its principal objects to provide means to avoid this difficulty.

Again, in the type of car stated, the parts frequently become so worn that the fly wheel magnets of the magneto become separated a great distance from the fixed coils, when the clutch is thrown out and, therefore, the magneto will not furnish sufficient spark without spinning the motor rapidly; in some cases one cannot spin the motor fast enough to produce the required spark, so the car must be put in "high" after jacking up the rear wheel, thereby allowing the transmission clutch spring to press the fly wheel up close to the magnets, so that only the proper clearance will be present and the magneto can furnish the required current necessary to produce a strong spark for starting; my invention is designed to overcome these difficulties also.

Furthermore, it is an object of the invention to provide means for relieving the battery and starter of a considerable load (when used on those cars employing electric starters) by disconnecting the drive shaft from the engine, while leaving the transmission clutch in engagement so that the entire transmission unit functions as a fly wheel in starting the motor.

In its more subordinate nature, the invention includes those novel details of construction, combination and arrangement of parts, all of which will be first fully described and then be specifically pointed out in the appended claims, reference being had to the accompanying drawings, in which:

Figure 1 is a side elevation of a portion of a transmission and drive shaft, the drive shaft, transmission and universal housing being shown in section and the parts being located in the starting position (drive shaft operatively disconnected from universal joint proper).

Figure 2 is a view similar to Figure 1, with the parts in the running position.

Figure 3 is a detail vertical longitudinal section of a portion of the structure shown in Figure 2.

Figure 4 is a detail elevation of the universal joint socketed clutch element.

Figure 5 is a detail end view of the toothed sleeve end of the universal joint element shown in Figure 4.

Figure 6 is a detail side view of the shiftable clutch element.

Figure 7 is an end view of the same.

Figure 8 is a detail elevation of the drive shaft.

Figure 9 is a detail end view of the same.

Figure 10 is a detail end view of the shaft end bushing.

Figure 11 is a plan view of the control lever and latch.

Figure 12 is a detail elevation of the latch.

Figure 13 is a horizontal section on the line 13—13 of Figure 2.

Figure 14 is a detail end view of the cam rod.

Figure 15 is an end elevation of the thrust collar clamp for holding the drive shaft against backward movement in the housing.

In the drawings in which like numerals and letters of reference indicate like parts in all of the figures, 1 represents the transmission housing, 2 the driving plate stub shaft of the transmission into the end of which the male member 4 of the universal joint knuckle fits.

The universal joint housing 5 is secured to the flange 6 of the housing 1 in the usual way by the flange ring 7. The housing 5 is on the forward end of the drive shaft tube 8.

The male and female universal joint knuckles are mounted in the joint coupling ring 9, as is the usual practice, and all of the aforenumbered parts may be of the same construction, as is now commonly used in cars of the type stated.

In applying my invention, I provide a washer 10 and a coil spring 11 on the male joint knuckle to thrust the joint back to keep the clutch members 14 and 19 in proper contact during the normal running of the machine.

For the usual female universal joint knuckle, I substitute the member 12 which is provided with a bore 13 that terminates at a wall 15 against which the end of the drive shaft 16 bears, the drive shaft being shaped down to an octagon 17 at its end and provided with a bushing 18 where it fits into the recess or bore 13.

Lubricant is admitted to the bore 13 through the opening 15′ in the knuckle 12.

The female universal joint knuckle 12 also is provided with clutch fingers 14 to co-operate with similar fingers 19 on the sliding clutch member 20, the latter having a square passage 21 to slidably fit on the square part 22 of the shaft 16.

A thrust spring bears against the rear face of the member 20 and against a washer 24 that rests in contact with the front end of the drive shaft bushing 25, the spring 23 serving to thrust the clutch member 20 into engagement with the clutch portion of the knuckle 12.

In cars of the type stated, the drive shaft housing or tube 8 has diametrically opposite holes 26 adjacent to the universal joint which are usually closable by plugs 27 and through which the pin, which pins the female knuckle to the shaft, may be inserted or removed.

When my invention is applied, however, the drive shaft and female knuckle are not pinned together but are adapted to be connected and disconnected by the shiftable clutch member 20 and in order to release the clutch 20 from the clutches 12—14, the top hole 26 is rebored and tapped to receive a short pipe or guide member 28 in which the cam shaft 31 is journaled.

The shaft 31 has a bottom flange 34 against which the guide 28 lies and it has an eccentric lug or crank member 32 to engage in the groove 33 of the clutch member 20. The weight of the shaft 31 is held on the guide by a washer 29 and cotter pin 30.

The shaft 31 has an upward extension 35 square in cross section to telescope in the similarly formed recess of the crank shaft 36, the latter projecting through a hole 37 in the floor board 39 and having its crank 38 arranged to be conveniently engaged by the foot of the operator.

The supporting floor 39 and the drive shaft housing have motion, relatively, toward and from one another owing to the rise and fall of the rear axle in passing over obstructions.

A latch 40 provides a means to hold the lever 38 with the clutch member 20 out of engagement.

In order to hold the shaft 16 against backward movement due to the elimination of the pin connection with the knuckle, I provide a split collar 41 with a flange to bear against the ball bearing 43 that is located adjacent to the rear end of the shaft (see Figures 2 and 15).

In operation, when it is desired to start the motor, the operator moves the lever 38 until it is retained by the latch 40, thus holding the clutch member 20 disengaged. The operator may then place the transmission clutch in "high" so that the clutch spring of the transmission can hold the fly wheel magnet close up to the stationary electro-magnets and enable the proper current to be generated to produce ignition sparks of the required intensity. The motor may be started either by manual, mechanical or electrical means, according to the equipment of the particular car on which the invention is used.

After the engine starts running, the transmission clutch is disengaged or placed in neutral and the lever 38 is released, whereupon the clutch member 20 locks into the clutch members 12—14 and the car is ready for operation in the usual manner.

With my invention applied, the operator can use heavy oil and yet start his motor with ease while without this device, heavy oil cannot be employed in cold weather owing to the difficulty of starting the motor, hence the motor usually does not get proper lubricant in cold weather and wears out rapidly.

While I have disclosed herein a preferred embodiment of the invention, which is particularly desirable for use with cars of the type stated, nevertheless I do not wish to be understood as limiting myself to such use or to the details of construction shown and described.

From the foregoing description taken in connection with the accompanying drawings, the complete construction, the manner of operation and the advantages of my invention will be readily understood by those skilled in the art to which it appertains.

What I claim is:

1. In an automobile wherein is provided a transmission shaft, a driving shaft, a universal joint between said transmission shaft and said driving shaft, and a floor board; a shiftable clutch located adjacent to the driving shaft side of the universal joint between it and the driving shaft to couple and uncouple said universal joint and said driving shaft, a housing for said universal joint and said driving shaft and said clutch, a clutch shifter mounted on said housing, and a clutch shifter operating device connected with said clutch shifter and located over the floor board in position conveniently accessible to the operator.

2. In combination with a driving shaft, a transmission shaft, a universal joint located between said shafts, and a housing for the aforesaid parts; a shiftable clutch connection between said universal joint and said driving shaft, a clutch shifting means, a support, said housing and said support being relatively movable toward and from one another, said clutch shifting means including a shifting lever and telescopic parts, one of which is mounted on said support and another is mounted on said housing.

3. In combination with an engine shaft, a driving shaft and a universal joint between said shafts, said universal joint including a female element having a clutch face, and adapted to receive said driving shaft, a shiftable clutch element on said driving shaft, a clutch shifter, means at a distant place for operating said shifter and means to hold said shifter with the clutch released.

4. In apparatus of the class described, a transmission housing, a prime mover shaft element, a drive shaft, a universal joint between said shaft element and said drive shaft, a drive shaft tube and universal joint housing, said universal joint including male and female knuckle members, one of which has a clutch element, a shiftable clutch element for connecting the same with one of said shafts and means to shift said shiftable clutch element.

5. A first motion shaft, a drive shaft and a universal joint between said shafts, said joint including male and female knuckles, one knuckle having a clutch face, a clutch element on one of said shafts to engage with said clutch face, a spring effecting such engagement, a spring and washer on the other knuckle engaging said first motion shaft to hold the clutch members in proper contact during normal running, and an operating device to release the clutch.

6. In apparatus of the class described, the combination with a drive shaft, a rear thrust bearing, a driving shaft tube and universal joint housing, a transmission case and a driving plate stub shaft; a universal joint connecting said stub shaft with said drive shaft and comprising a male and a female knuckle member, a ring connecting said members together, said male knuckle member adapted to engage said driving plate stub shaft, a back pressing spring between said male knuckle member and said driving plate stub shaft, said drive shaft entering said female knuckle member and having bearing therein, means for admitting lubricant into said female knuckle member bearing of the drive shaft, said female knuckle member having a clutch element and a sliding clutch element on said drive shaft cooperating with said knuckle clutch element and a spring for pressing said slidable clutch element into engagement with said knuckle clutch element, and means for moving said sliding clutch element against the tension of said spring.

7. In apparatus of the class described, the combination with a drive shaft, a rear thrust bearing, a drive shaft tube and universal joint housing, a transmission case and a driving plate stub shaft; a universal joint connecting said stub shaft with said drive shaft and comprising a male and a female knuckle member, a ring connecting said members together, said male knuckle member adapted to engage said driving plate stud shaft, a back pressing spring between said male knuckle member and said driving plate stub shaft, said drive shaft entering said female knuckle member and having bearing therein, means for admitting lubricant into said female knuckle member bearing of the drive shaft, said female knuckle member having a clutch element and a sliding clutch element on said drive shaft cooperating with said knuckle clutch element and a spring for pressing said slidable clutch element into engagement with said knuckle clutch element and means for moving said sliding clutch element against the tension of said spring, said means comprising a guide tube on said drive shaft tube and universal joint housing, a cam shaft journalled in said tube and having an eccentric element in engagement with said slidable clutch element and a lever for turning said cam shaft.

8. In apparatus of the class described, the combination with a drive shaft, a rear thrust bearing, a drive shaft tube and universal joint housing, a transmission case and a driving plate stub shaft; a universal joint connecting said stub shaft with said drive shaft and comprising a male and a female knuckle member, a ring connecting said members together, said male knuckle member adapted to engage said driving plate stub shaft, a back pressing spring between said male knuckle member and said driving plate stub shaft, said drive shaft entering said female knuckle member and having bearing therein, means for admitting lubricant into said female knuckle member bearing of the drive shaft, said female knuckle member having a clutch element and a sliding clutch element on said drive shaft cooperating with said knuckle clutch element and a spring for pressing said slidable clutch element into engagement with said knuckle clutch element and means for moving said sliding clutch element against the tension of said spring, said means comprising a guide tube on said drive shaft tube and universal joint housing, a cam shaft journalled in said tube and having an eccentric element in engagement with said slidable clutch element and a lever for turning said cam shaft, and a latch device for holding said lever in position to retain said sliding clutch element disengaged.

9. In apparatus of the class described, a drive shaft and universal joint housing, a thrust bearing at the rear of said drive shaft housing, a drive shaft located in said housing, a thrust collar secured to the drive shaft to engage said thrust bearing to hold the drive shaft against backward movement, a drive shaft bushing in said housing for the forward end of said drive shaft, a universal joint in said universal joint housing which comprises male and female knuckle members, the female knuckle member having a recess terminating at a wall, said drive shaft having its forward end bushed to bear in said female knuckle recess, said female knuckle member including a clutch face, a sliding clutch element on said drive shaft to cooperate with said knuckle clutch face to cause said female knuckle and said drive shaft to turn together, and means for shifting said shiftable clutch element into and out of engagement substantially as shown and described.

10. In apparatus of the class described, a drive shaft and universal joint housing, a thrust bearing at the rear of said drive shaft housing, a drive shaft located in said housing, a thrust collar secured to the drive shaft to engage said thrust bearing to hold the drive shaft against backward movement, a drive shaft bushing in said housing for the forward end of said drive shaft, a universal joint in said universal joint housing which comprises male and female knuckle members, the female knuckle member having a recess terminating at a wall, said drive shaft having its forward end bushed to bear in said female knuckle recess, said female knuckle member including a clutch face, a sliding clutch element on said drive shaft to cooperate with said knuckle clutch face to cause said female knuckle and said drive shaft to turn together, means for shifting said shiftable clutch element into and out of engagement, and means tending to thrust said universal joint toward said drive shaft to keep the wall of said female knuckle in endwise engagement with said drive shaft, substantially as shown and described.

11. In apparatus of the class described, the combination with the transmission housing, the drive shaft housing and the universal joint housing connected between the drive shaft housing and the transmission housing of an automobile, the transmission shaft and the driving shaft and a universal joint between the transmission shaft and the driving shaft; a clutch element formed on one of the parts of said universal joint, a shiftable clutch element mounted on said driving shaft to cooperate with said first mentioned clutch element, a clutch shifter mounted on said driving shaft housing for shifting said shiftable clutch element to disengage the clutch, a spring tending to engage the clutch, another spring tending to hold the universal joint against the driving shaft and means under the control of the foot of the operator for shifting said shiftable clutch element.

12. In apparatus of the class described, the combination with the transmission housing, the drive shaft housing and the universal joint housing connected between the drive shaft housing and the transmission housing of an automobile, the transmission shaft and the driving shaft and a universal joint between the transmission shaft and the driving shaft; a clutch element formed on one of the parts of said universal joint, a shiftable clutch element mounted on said driving shaft to cooperate with said first mentioned clutch element, a clutch shifter mounted on said driving shaft housing for shifting said shiftable clutch element to disengage the clutch, a spring tending to engage the clutch, another spring tending to hold the universal joint against the driving shaft, means under the control of the foot of the operator for shifting said shiftable clutch element, and means for holding said shifting means latched to hold the clutch disengaged.

13. In apparatus of the class described, the combination with a universal joint, a driving shaft having an angular-surfaced end, a cylindrical sleeve provided with an angular-surfaced opening to fit on said end, said universal joint having a female element to receive said circular sleeve and the end of said driving shaft on which it is fitted, said female element of the universal joint having a clutch face, a sliding clutch member mounted on said driving shaft and means for operating said sliding clutch member to clutch and unclutch said driving shaft and universal joint.

14. In combination with a first motion shaft having a cavity in its end, a universal joint having male and female elements, the male element of which fits the cavity of said first motion shaft, a driving shaft having a male portion to fit the female element of the universal joint, said female element of said universal joint having a clutch face, a shifting clutch member mounted on said driving shaft to cooperate with said clutch face, means continuously tending to engage said clutch member with said clutch face, other means for moving said clutch member out of engagement with said clutch face, and means for maintaining said universal joint in proper correlative position with respect to said driving shaft.

EDDIE ALLEN LEWIS.